Jan. 25, 1955 H. QUERY 2,700,552
STAKE LOCKING MEANS FOR STAKE BUNKS
Filed Nov. 3, 1952 2 Sheets-Sheet 2
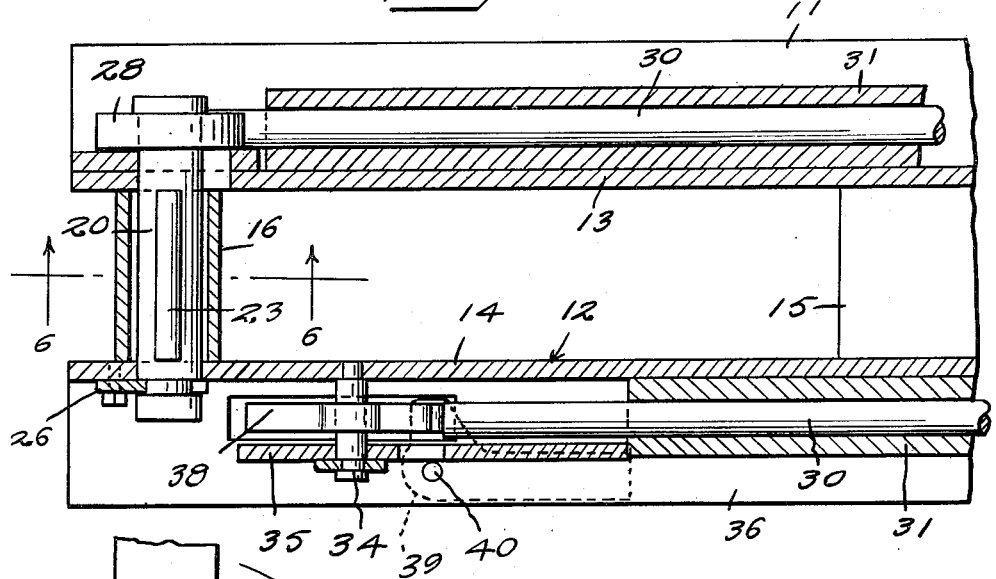
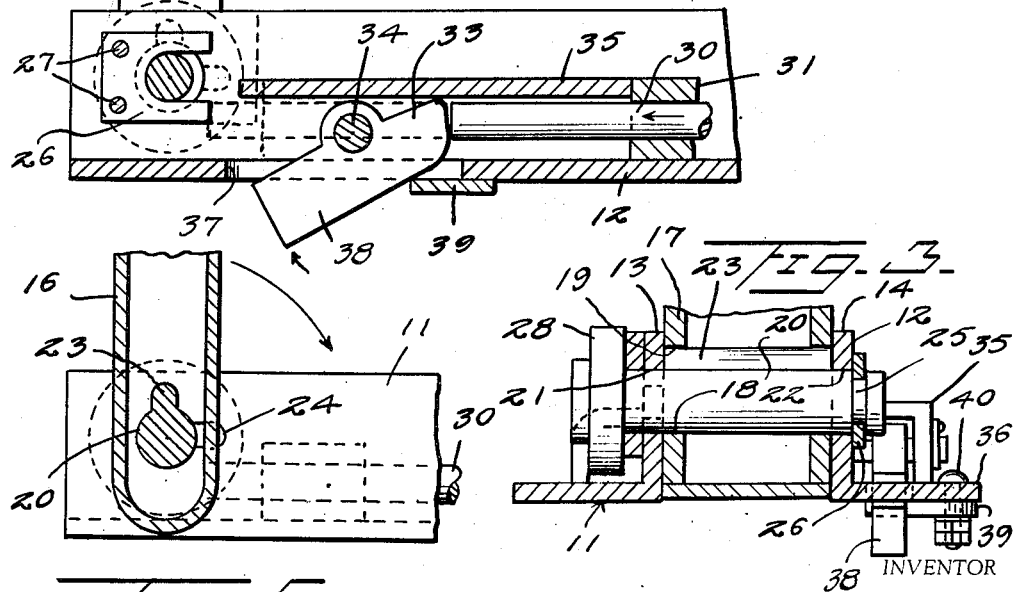
INVENTOR
Henry Query
BY Kimmel & Crowell
ATTORNEYS

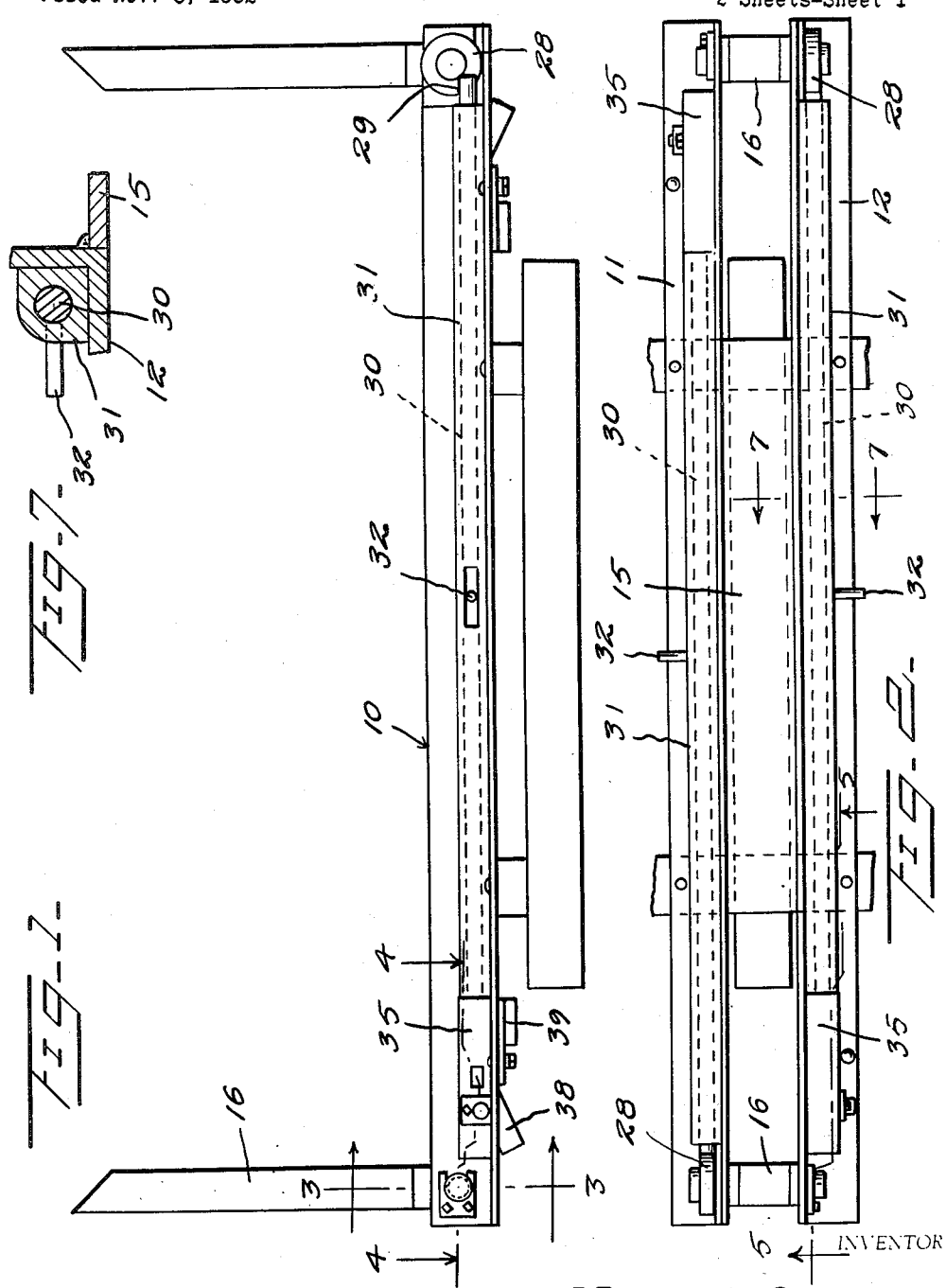

United States Patent Office 2,700,552
Patented Jan. 25, 1955

2,700,552

STAKE LOCKING MEANS FOR STAKE BUNKS

Henry Query, Salem, Oreg.

Application November 3, 1952, Serial No. 318,471

2 Claims. (Cl. 280—145)

This invention relates to stake bunks adapted for mounting on trucks or trailers.

An object of this invention is to provide an improved stake bunk with means for locking the stakes in upright position for holding logs or other material on the truck or trailer body.

Another object of this invention is to provide a stake bunk wherein an improved means is provided for detachably mounting the lower ends of the stakes to the bunk or base frame.

A further object of this invention is to provide a stake bunk with an improved means for locking the stake in upright position and releasing the stake for swinging movement in either direction, outwardly to a depending position beside the bunk, or inwardly to rest on the bunk body.

With the above and other objects in view, my invention consists in the arrangement, combination and details of construction disclosed in the drawings and specification, and then more particularly pointed out in the appended claims.

In the drawings—

Figure 1 is a detailed side elevation of a stake bunk constructed according to an embodiment of this invention, Figure 2 is a plan view of the device, Figure 3 is a fragmentary sectional view taken on the line 3—3 of Figure 1, Figure 4 is a fragmentary sectional view taken on the line 4—4 of Figure 1, Figure 5 is a fragmentary sectional view taken on the line 5—5 of Figure 2, Figure 6 is a fragmentary sectional view taken on the line 6—6 of Figure 4, Figure 7 is a fragmentary sectional view taken on the line 7—7 of Figure 2.

Referring to the drawings, the numeral 10 designates generally a bunk which is adapted to be mounted on a truck or trailer frame. The bunk 10 is formed of a pair of elongated angle bars 11 and 12, which are secured together in parallel relation with the vertical sides 13 and 14 thereof innermost, by means of a connecting plate 15.

The bunk 10 has mounted between the angle members 11 and 12 thereof a pair of stakes 16 which are disposed one at each end of the bunk. The stakes 16 are of hollow construction, as shown in Figures 3, 4, and 6, and each stake adjacent the lower end thereof is provided in the opposite side walls 17 thereof with circular openings 18, and an offset opening or notch 19, the purpose for which will be hereinafter described.

A shaft or pin 20 is extended through openings 21 and 22 formed in the vertical sides 13 and 14, and the shaft 20 has secured lengthwise thereof a key member 23. The vertical side 13 of angle member 11 is formed with a keyway 24 through which the key 23 is adapted to pass, and the key 23 is of a length to loosely engage between the confronting faces of the vertical sides 13 and 14 so that key member 23 will hold the shaft 20 against endwise movement.

Shaft 20 extends through opening 22 in angle member 12 and an annular groove 25 is formed in the projecting end of shaft 20 for receiving a U-shaped locking member 26, secured by fastening means 27 to the outer side of vertical side 14 of angle member 12. The opposite end of shaft 20 has secured thereto an annulus or ring 28 which is formed with a right angle notch or keeper 29.

An elongated locking bar 30 is slidably mounted in bearing members 31 carried by each angle member 11 and 12, and the bar 30 when in locking position is adapted to engage in the keeper 29, as shown in Figure 1. The bar 30 has a handle 32 secured thereto and projecting laterally therefrom, the position of the handle relative to the length of the bar 30 being optional, but is here shown as being disposed in substantially the center of the length of bar 30.

In order to provide a means whereby bar 30 will be held in locked position, I have provided a gravity operated locking member 33 which is pivotally mounted on a shaft or pin 34. An open-ended housing 35 is secured to the angle bar, such as angle bar 12 in Figure 3, and pin 34 extends through the outer side of housing 35 and into the vertical side 14 of angle bar 12. The horizontal lower side 36 of angle bar 12 is formed with an elongated slot 37 through which the weighted outer end 38 of locking member 33 is adapted to swing.

The upper inner end of locking member 33 is adapted to normally engage the upper horizontal side of housing 35, as shown in Figure 5, and at this time the adjacent end of locking bar 30 will abut against the inner end of locking member 33.

In order to provide means whereby locking member 33 will not become accidentally disengaged from bar 30, I have provided an L-shaped locking member 39 which is pivoted on a pivot 40 extending through the horizontal side 36 of angle member 12. The locking member 39 is adapted, as shown in Figure 5, to engage beneath the forward lower portion of locking member 33 so as to prevent this locking member from swinging downwardly and thereby releasing locking member 30.

It will be understood that the stake at one end of bunk 10 will be locked and released by means of a locking bar 30 disposed on one side of the bunk and the opposite stake will be locked and released by a locking bar 30 disposed on the opposite side of the bunk.

In the use and operation of this bunk, the bunk 10 is secured in any suitable manner to the truck or trailer frame in a position transverse of the length of the frame, the locks being released and the stakes being in depending position beside the bunk body. After the logs or other material are loaded onto the bunk 10, the stakes 16 may be swung upwardly to a vertical position, as shown in Figure 1. When it is desired to unload the logs or other material from one side of the truck or trailer, the stakes on that side of the truck or trailer may be swung downwardly by releasing locking member 39 and pushing the weighted end 38 of locking member 33 upwardly. At this time locking member 33 will be disengaged from locking bar 30, and the latter may be moved lengthwise or to the left, as viewed in Figure 5, so that the opposite or locking end of bar 30 will be disengaged from keeper 29. The released stake may then swing downwardly to a depending position and the material moved laterally off of the truck or trailer frame. For the return trip with the bunk empty the locks may remain unlatched and the stakes swung to a flat position on the bunk body.

The bunk and stake assembly hereinbefore described is of such construction as to positively lock the stakes in vertical operative position so that this stake cannot be accidentally released or disengaged.

I do not mean to confine myself to the exact details of construction herein disclosed, but claim all variations falling within the purview of the appended claims.

What I claim is:

1. A stake bunk comprising a bunk formed of a pair of elongated angle members, means securing said members together in spaced parallel relation, a shaft rotatably carried by each end of said bunk, a stake keyed to each shaft between said angle members, a circular flange fixed to one end of each shaft and formed with a peripheral keeper notch, a circumferential groove formed on said shafts adjacent the other ends thereof, said flanges and said grooves being disposed adjacent the remote sides of said members, means secured to said members and engageable within said grooves to releasably secure said shafts on said members, a linearly movable locking bar carried by each angle member adapted when in locking position to engage said keeper, a pivoted lock carried by said bunk confronting an end of said bar, a weight carried by said lock gravitatingly urging said lock to abutting relation with the end of the bar to hold said bar in stable locking position, and a manually operable horizontally movable locking member carried by said bunk engageable with said pivoted lock for holding the latter in bar locking position.

2. A stake bunk comprising a pair of elongated angle members, having oppositely disposed spaced substantially parallel sides and having oppositely disposed aligned openings at each end thereof of which at least one of each pair of aligned openings is provided with a radially extending slot, a stake for each end of said angle members having an end thereof positioned between said sides and having a transversely extending opening formed therein with a radially extending notch, said openings and notches at each end of said angle members being aligned with the openings and notches formed in their respective adjacent stakes when said stakes are folded down with the longitudinal axis being substantially parallel to the longitudinal axis of said angle members, a shaft for each end of said angle members having a key formed thereon and extending through said aligned openings and said notches formed in said sides and stakes and rotatably supported on and extending between said sides, each of said shafts having an enlarged circular flange adjacent an end thereof and provided with a notch extending inwardly from their respective circumferences, each of said shafts having a circumferential groove formed therein adjacent their respective other ends, said flanges and said grooves being positioned adjacent the remote surfaces of said sides, means engaging within said grooves and secured to said sides to removably secure said shafts in their respective positions, a lock bar extending longitudinally of each of said sides and secured to said angle members for axial movement relative thereto and having an end thereof engageable within one of said notches formed in said flanges, a gravity operated lock member pivotally mounted on each of said angle members and having one end thereof adapted for engagement with the other ends, respectively, of said lock bars releasably securing said stakes in their upright position, and a lever pivotally mounted on one of said angle members adjacent each end thereof and having an end displaceable into the path of movement of said one end of said lock members, respectively, whereby said lock members are releasably secured in their engaging position against said other of said ends of said bars.

References Cited in the file of this patent
UNITED STATES PATENTS

| | | |
|---|---|---|
| 841,068 | Summers | Jan. 8, 1907 |
| 1,278,587 | Burgess | Sept. 10, 1918 |
| 2,469,760 | Berry | May 10, 1949 |